(12) United States Patent
Cantu et al.

(10) Patent No.: US 9,071,880 B2
(45) Date of Patent: *Jun. 30, 2015

(54) SYSTEM AND METHOD FOR CONTROL OF A SET TOP BOX

(71) Applicant: AT&T Intellectual Property I, LP, Atlanta, GA (US)

(72) Inventors: Diana Maria Cantu, Georgetown, TX (US); Chaoxin Qiu, Austin, TX (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/266,264

(22) Filed: Apr. 30, 2014

(65) Prior Publication Data
US 2014/0237515 A1    Aug. 21, 2014

Related U.S. Application Data

(63) Continuation of application No. 11/404,223, filed on Apr. 13, 2006.

(51) Int. Cl.
| | |
|---|---|
| *H04N 21/485* | (2011.01) |
| *H04M 11/00* | (2006.01) |
| *H04N 21/61* | (2011.01) |
| *H04L 12/28* | (2006.01) |

(52) U.S. Cl.
CPC .......... *H04N 21/485* (2013.01); *H04L 12/2818* (2013.01); *H04L 2012/2849* (2013.01); *H04M 11/007* (2013.01); *H04N 21/6137* (2013.01)

(58) Field of Classification Search
None
See application file for complete search history.

(56) References Cited

U.S. PATENT DOCUMENTS

| | | | |
|---|---|---|---|
| 6,915,525 B2 | 7/2005 | Ozawa | |
| 7,606,529 B1 | 10/2009 | Swan | |
| 8,755,335 B2 * | 6/2014 | Cantu et al. | 370/329 |
| 2001/0031043 A1 | 10/2001 | Kim | |
| 2002/0073219 A1 * | 6/2002 | Kikinis | 709/231 |
| 2002/0124266 A1 | 9/2002 | Blanchard | |
| 2002/0138830 A1 * | 9/2002 | Nagaoka et al. | 725/14 |
| 2002/0162116 A1 | 10/2002 | Read | |
| 2003/0005446 A1 * | 1/2003 | Jaff et al. | 725/51 |
| 2003/0167171 A1 | 9/2003 | Calderone | |
| 2005/0155081 A1 | 7/2005 | Chiou | |

(Continued)

FOREIGN PATENT DOCUMENTS

| | | |
|---|---|---|
| JP | 2002217937 | 8/2002 |
| WO | 00/67475 | 11/2000 |

(Continued)

*Primary Examiner* — Jason Mattis
*Assistant Examiner* — Adnan Baig
(74) *Attorney, Agent, or Firm* — Guntin & Gust, PLC; Ralph Trementozzi

(57) ABSTRACT

According to one example embodiment disclosed herein, there is provided a system and an article of manufacture allowing a set top box to be controlled from an interactive voice response unit. A system according to an example embodiment may include a set top box control processor having a common-layer application interface and a control plug-in framework. An interactive voice processor obtains voice inputs from a voice call and through the set top box control processor remotely accesses control features of a set top box. The set top box control processor performs command process management to manage set top box commands including changing channels and controlling volume. Other embodiments are disclosed.

20 Claims, 6 Drawing Sheets

(56) References Cited

U.S. PATENT DOCUMENTS

2005/0208995 A1* 9/2005 Marshall et al. ............... 463/25
2005/0283368 A1 12/2005 Leung
2007/0182855 A1 8/2007 Nadarajah

FOREIGN PATENT DOCUMENTS

WO 0230120 4/2002
WO 03021914 3/2003

* cited by examiner

SYSTEM AND METHOD FOR CONTROL OF A SET TOP BOX

CROSS-REFERENCE TO RELATED APPLICATIONS

This application is a Continuation of and claims priority to U.S. patent application Ser. No. 11/404,223, filed Apr. 13, 2006. The contents of the foregoing are hereby incorporated by reference into this application as if set forth herein in full.

FIELD OF THE DISCLOSURE

The inventive subject matter relates generally to television distribution system, and more specifically to systems and methods for use with a set top box in a television distribution system.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006, SBC Knowledge Ventures L.P. All Rights Reserved.

BACKGROUND OF THE DISCLOSURE

Cable, satellite and Internet Protocol television (IPTV) systems typically employ a Set Top Box (STB) unit that is connected to the source of programming and also provides one or more signals for input to television or other viewing devices. A STB unit typically allows a subscriber to select programming to view or to avail themselves of other features or services. Such features or services include, for example, television programming, on-demand programming, and digital video recorder (DVR) capabilities that may be incorporated in the STB. Most STBs include a hand-held remote control device, typically employing infrared or RF signals to send commands to the STB. The RC device and corresponding capabilities in the STB provide for remote control of the STB and the various functions and features it may provide. The remote control device, however, is usually only effective when it is in a line-of-sight with the STB, or at least on the same premises as the STB. Subscribers may, however, for a variety of reasons, wish to remotely control the STB from more distant locations, including locations outside of the subscriber's premises where the STB is located.

DETAILED DESCRIPTION OF THE DRAWINGS

Figure 1:
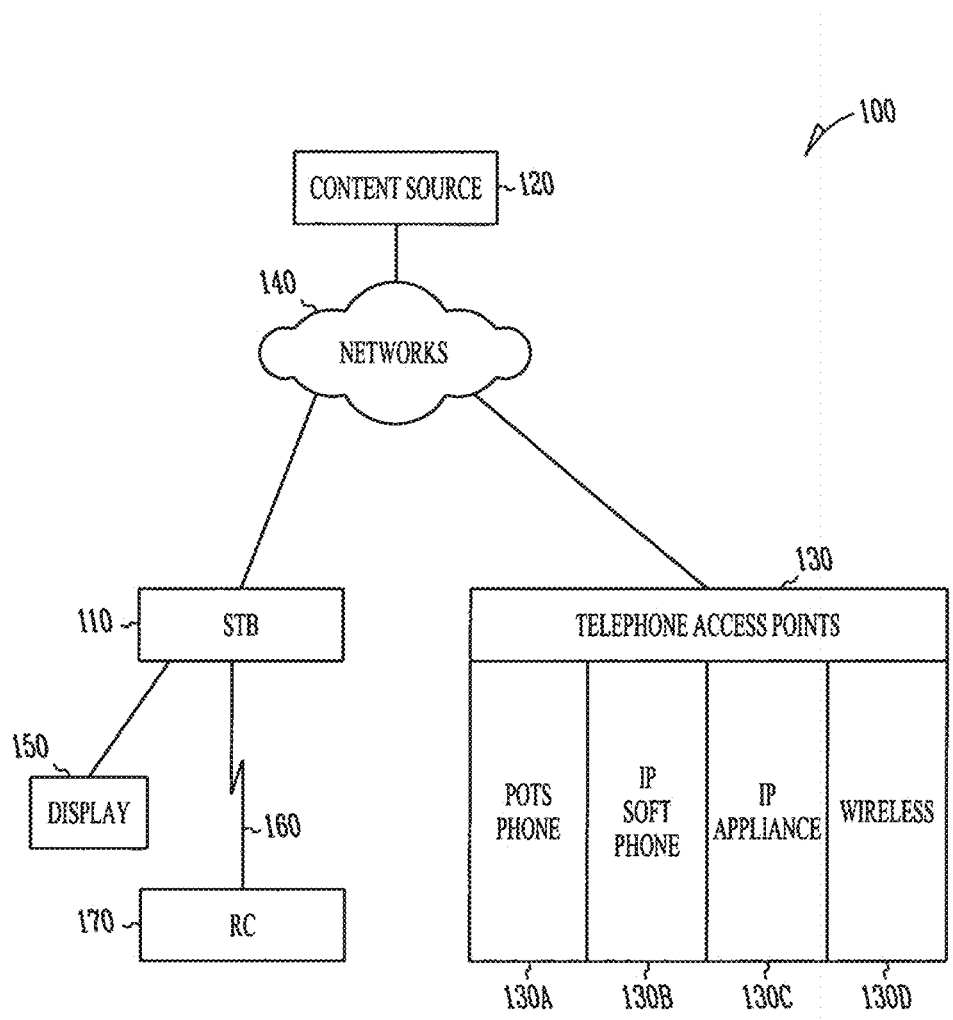
FIG. 1 illustrates an example embodiment of a system and method for remote control of a set top box device or software according to the inventive subject matter disclosed herein.

Referring now to FIG. 1, there is illustrated a first embodiment 100 of the inventive subject matter described herein, wherein a set top box (STB) 110 is connected to one or more content sources 120, and one or more telephone access points 130 through one or more networks 60. Content sources 120 may, for example, be a broadcast or cable television feed or video servers to supply broadcast television or on-demand movies or television programming STB 110 further may be connected to an audiovisual display device 150, such as a television or a video display working in conjunction with a sound-system, that allows audio or audiovisual content obtained from the STB 110 to be played to a subscriber 160. STB 110 may be controlled, for example, using a conventional remote control (RC) 170 or the telephone access points 130 which may take the form of, but are not limited to, so-called plain-old-telephone service (POTS) 130A, an Internet Protocol (IP) soft telephone 130B, an IP telephone appliance 130C, or a wireless mobile telephone 130D, sometimes collectively referred to herein as telephone access points 130. The STB 110 receives, in one embodiment, audiovisual content, such as television programming or on-demand programming, from the one or more content sources 120. According to one example embodiment, the STB 110 receives remote control signals from the RC 170 in order to provide remote control features. Such remote control features may include the remote control of any of the control or programming features offered by the STB 110, for example but not limited to on/off, channel change, volume control, menu activation for STB functions, menu selections and entry, digital, or reverse tuning, and where the STB 110 includes a built-in video recorder (DVR), functions for example to select programming to record or play. Further, telephone access points 130 may deliver remote control signals 160 to the STB 110 through the one or more networks 60 According to still another example embodiment, the same, fewer or more remote control features as those effectuated with the RC 170 are enabled through the telephone access point 130. For example, in one example embodiment, the STB 110 may be turned on using one of the telephone access points 130 by dialing a simple sequence, such as *XXX, where X may be a number or character accessed using the telephone access point 130.

According to still another example embodiment, the POTS telephone 130A may be any phone or phone system that works in conjunction with the public switched telephone network (PSTN), such as simple wireline phone connected to the PSTN through an RJ11 connector, or a wireless home phone system with a base station that also connects to the PSTN through an RJ11 connector. IP soft telephone 130B may be implemented using a client program downloaded on a computing device and used in conjunction with an input microphone and audio output, such as provided through the computing device's built-in devices, or through external devices such as a head set. The IP telephone appliance 130C may be a device that may convert a voice signal to and from a digitized form, and send and receive the digitized voice signal over an IP-based network. IP soft telephones 130B and IP telephone appliance 130C may connect to through a wired or wireless network connection to a voice over IP (VoIP) platform or service, such as but not limited to a wireline network or, for example, a wireless connection through a WiFi (for example 802.11a) or WiMax (802.11g) network. Wireless mobile telephone 130D may take the form of any wireless mobile telephone operating using, for example but not limited to, CDMA, GSM, WiFi, or WiMax wireless communication technology.

Thus, according to one example embodiment of the inventive subject matter, the remote control capabilities of system 100 may provide subscribers 160 with advantageous control of the STB 110 using a telephone access point. Further, according to one example embodiment, subscriber 160 may be required to subscribe to both television services, for example delivered from content sources 120, and to telephony services that may connect the telephone access points 130 to other subscribers 160 through a proprietary network or to the telephones used by non-subscribers, for example through the PSTN. Such television services or telephony services may, for example, be offered by, or be connected together with, a single entity that offers for sale and supports the system, and collect subscription fees from subscribers 160 for the use of such services. Alternatively, more than one entity may cooperate or partner with one another to provide and offer such services in conjunction with one another. According to another example embodiment, the parties offering the television and telephony services are independent from one another except for supporting interfaces that allow the telephony services to interface with television services to provide the remote control functionality described herein above and below. Where such services are all offered or sponsored by a single entity, the advantageous remote control feature using the telephone access points 130 to control the STB 110 may be used to entice potential subscribers to sign up for both services as opposed to only one of the services, for example by only offering the remote control features to those subscribers that use both the television and telephony services offered or sponsored by the entity. In addition, the entity or partner offering or sponsoring the capabilities may have an opportunity to generate additional revenue using value-added services enabled by the remote control operation, or by increasing network usage and potentially revenue based on the level of network usage.

Figure 2:
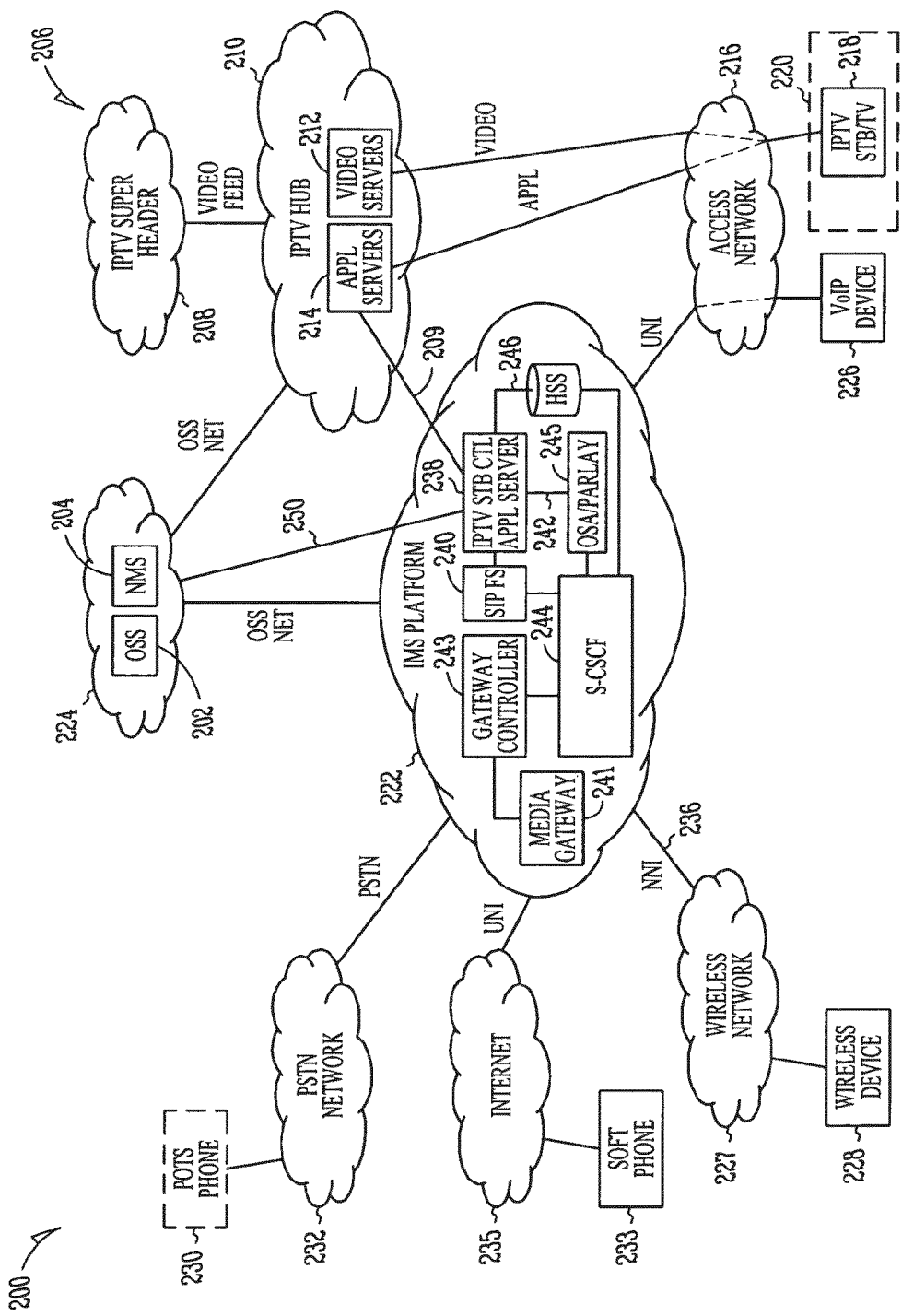
FIG. 2 illustrates another example embodiment of a system and method according to the inventive subject matter disclosed herein.

Referring now to FIG. 2, there is illustrated yet another example embodiment of a system 200 of the inventive subject matter described herein. System 200, according to one embodiment, includes an Operation and Support Systems (OSS) 202 and Network Management Systems (NMS) 204. Also included is an IPTV Network 206 including, for example, an IPTV Super Headend 208, an IPTV hub office 210 (sometimes also referred to as a Branch Office) that includes a video server farm 212 and an application server farm 214. Further included is an Access Network 216, for example based on HTTx technology, and an IPTV-based STB 218 at a customer premises 220. The system 200 further includes an IP Multimedia Subsystem (IMS) platform 222 providing Consumer VoIP (CVoIP) capabilities. The system may further include an IMS Server Office 224, and an IMS Access Office (not depicted). According to one example embodiment, telephony users may be connected to the IMS platform 222 through various user access points. These access points may include for example, a VoIP device 226, such as VoIP appliance 130C, may access the IMS platform 222 from home or from the Internet, wireless devices 228, such as mobile telephone 130D, may access the IMS platform 222 from a wireless network 234, and traditional POTS phones 230, such as telephone 130A, may access the IMS network 222 via the PSTN 232. According to one example embodiment, routing numbers and translations are provisioned in PSTN 232 in order to facilitate access by the POTS phones 230. In another example embodiment, the wireless network 234 may be operated by a third party wireless operator that has a peering agreement with the IMS network 222, wherein an NNI interface 236 is implemented between the two networks. According to one example embodiment, the IMS network 222 may be implemented with a standardized Next Generation Networking (NGN) architecture that may provide mobile and fixed multimedia services. In one example embodiment it uses a Voice-over-IP (VoIP) implementation based on a 3GPP standardized implementation of Session Initiation Protocol (SIP), and runs over the standard Internet Protocol (IP). Existing phone systems (both packet-switched and circuit-switched) are supported. According to another example embodiment, the IMS network 222 may provide all the services, current and future, that the Internet provides. In addition, in order to support the use of such services when roaming as well as from a business or home network, IMS may use open standard IP protocols, defined by the Internet Engineering Task Force (IETF). Accordingly, a multimedia session between two IMS users, between an IMS user and a user on the Internet, and between two users on the Internet may be established using the same or a similar approach. Moreover, the interfaces for service developers are also based on IP protocols. Accordingly, IMS has the capability, at least in some embodiments, to merge the Internet with the cellular telephone world, for example using cellular technologies to provide ubiquitous access and Internet technologies to provide appealing services.

According to another example embodiment, SIP is a protocol developed by the IETF MMUSIC Working Group and is the proposed standard for initiating, modifying, and terminating an interactive user session that involves multimedia elements such as video, voice, instant messaging, online games, and virtual reality. SIP is accepted as a 3GPP signaling protocol and permanent element of the IMS architecture. It is one possible signaling protocol for Voice over IP, along with H.323.

According to one example embodiment, an IMS media gateway 241 and gateway controller 243 are provided. Media gateway 241 may function to convert media provided in one type of network to the format required in another type of network. For example, media gateway 241 may terminate bearer channels from a switched circuit network (e.g. DS0s) and media streams from a packet network (e.g. RTP streams in an IP network). Media gateway 241 may also be capable of processing audio, video and T.120 alone or in any combination, and be capable of full duplex media translations. The media gateway 241 may also play audio/video messages and perform other interactive voice response (IVR) functions, or may perform media conferencing. According to another example embodiment, the media gateway controller 243 controls the parts of the call state that pertain to connection control for media channels in the media gateway 241. The media gateway controller 243 may, in one example embodiment, provide the following functions: i) communicate with the S-CSCF 244 (wherein S-CSCF means "Serving-Call/Session Control Function"); ii) select the call session control function (CSCF) depending on the routing number for incoming calls from legacy networks; iii) perform protocol conversion between ISDN user part (ISUP) and the IMS platform 222 subsystem call control protocols; and iv) receive out of band information and forward it to the S-CSCF 244 and the media gateway 241.

Further included in system 200 is an IPTV STB Control Application Server (STB Control Server) 238. To the IMS platform 222, the STB Control Server 238 is configured and acts as one of potentially many SIP Application Servers 240 (sometimes also referred to as feature servers), using 3GPP IMS standard terminology. According to one example embodiment, the IMS platform 222 provides two standard interfaces for the communication between the platform and any SIP Application Feature Servers 240. A first one of these is an ISC Reference Point 242 situated between a S-CSCF 244 and the STB Control Server 238. This interface, in one example embodiment, runs standard SIP protocol for session setup and control. The second interface is a Sh Reference Point 246 situated between the IMS HSS database 248 (Home Subscriber System) 248 and the STB Control Server 238. This interface, in one example embodiment, may run standard DIAMETER protocol with IMS Application Profile for access control and AAA (authentication, authorization and accounting) function support. According to one embodiment, Diameter is an AAA protocol for applications such as network access or IP mobility, defined, for example, by IETF RFC 3588. The basic concept is to provide a base protocol that can be extended in order to provide AAA services to new access technologies. Diameter is intended to work in both local and roaming AAA situations. In addition, an OSA/Parlay Gateway 245 is located between S-CSCF 244 and IPTV STB CTL APPL Server 238.

The S-CSCF 244 is a central node of the signaling plane. In one embodiment, the S-CSCF is a SIP server, but performs session control as well. It's always located in the home network. The S-CSCF 244 may use DIAMETER Cx and Dx interfaces to the HSS database 248 to download and upload user profiles—it only caches user information, such as service profiles, locally, when a user has a valid registration. According to one example embodiment, the S-CSCF provides the following functions:
  1. It handles SIP registrations, which allows it to bind the user location (e.g. the IP address of the terminal) and the SIP address.
  2. It sits on the path of all signaling messages, and can inspect every message.
  3. It decides to which application server(s) the SIP message may be forwarded to, in order to provide their services.
  4. It provides routing services, typically using ENUM (Telephone NUmber Mapping, also referred to E164 NUmber Mapping) lookups.
  5. It enforces the policy of the network operator.

According to still another example embodiment, the STB Control Server 238 also supports a back office interface 250 for configuration and provisioning. If the Sh Reference Point 246 is not supported, for example, then it may implement a LDAP database with the back office OSS 202 to handle access control and AAA functions. Further, the STB Control Server 238 may implement one or more interfaces with the IPTV hub office 210 to perform control functions at a targeted STB 218. These interfaces may comply with any API specification provided for the IPTV application servers in server farm 214

Figure 3:
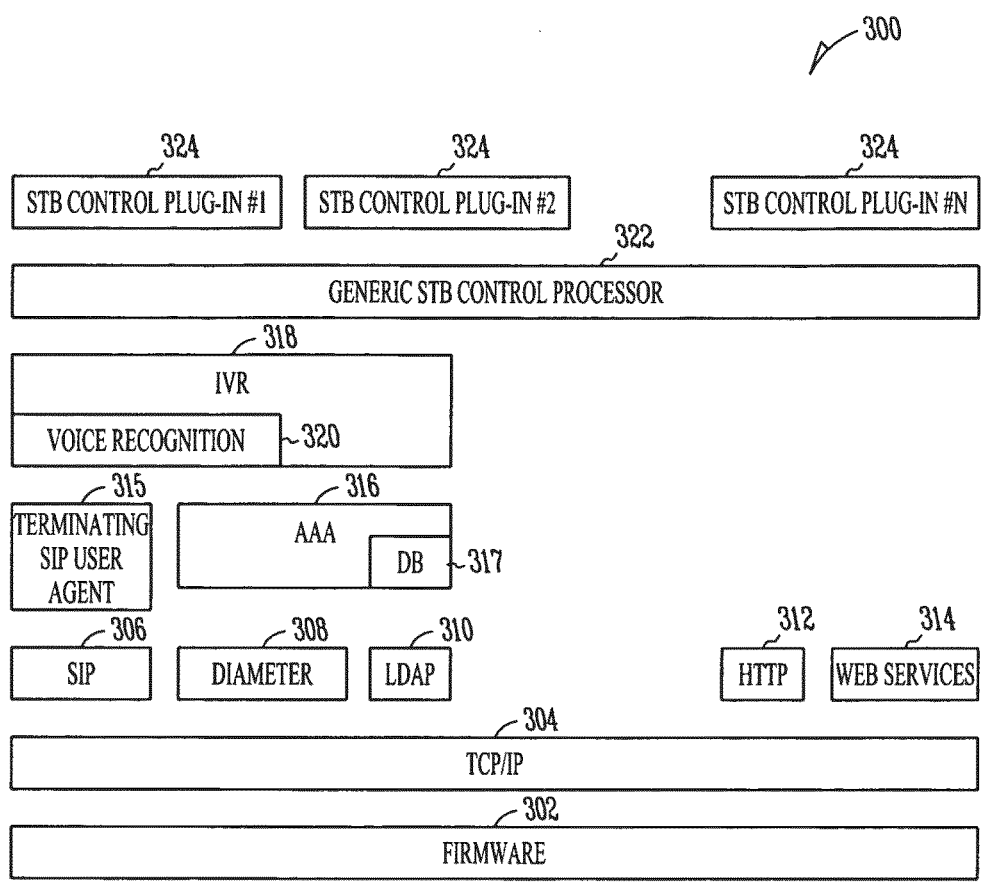
FIGS. 3 and 4 illustrate a set top box control server architecture according to one example embodiment of the inventive subject matter disclosed herein.

Referring now to FIG. 3 there is illustrated one example embodiment of an architecture 300 of the STB Control Server 238 according to the inventive subject matter disclosed herein. According to one example embodiment, the architecture may be implemented on any suitable server platform. According to one example embodiment, the server satisfies desired requirements on manageability, security, reliability and performance. As illustrated, the architecture includes firmware 302, which may include device drivers and other lower level embedded software in the operating system, a TCP/IP layer 304, for example including a TCP/IP protocol stack and the socket API, a SIP messaging interface 306 used, for example, for communication with IMS platform 222 using SIP protocol, and a DIAMETER interface 308 may also be provided to support the communication with IMS HSS database 248 and potentially some other OSS systems 202. Also included may be an LDAP interface 310 that may be used to communicate with back office LDAP database for provisioning and network configuration, a HTTP interface 312 that may be used to communication with VoIP web portal as well as the web servers in IPTV hub office 210, and a Web Service API interface 314 that may be used for communication with most of the IPTV application server systems in server farm 214. Another component included may be a Terminating SIP User Agent 315 that may be used for session control and call semantics. This agent may interact with IMS S-CSCF 244 function. Still another function that may be included is an AAA functions 316 with optional local database for subscriber information. Even though incoming calls are already authenticated and authorized via standard IMS/SIP protocol with the support of HSS database 248, this AAA function 316 is specific to the access to a target STB 218. Security may therefore be tightened to try to prevent potential hacking (unlawful accesses) from the network to home STB 218.

Still further, architecture 300 may include an IVR functional module 318 that may be provide an Interactive Voice Response function is the most common user interface for telephony based command interface. When a user dial up from a telephone device, the SIP function 306 may set up a call session. The IVR functional module 318 may be used to prompt user for access ID and password, which is given to AA function 316 for authentication. The IVR functional module 318 may then further prompt user based on a section menu to allow the caller to decide what to do with the STB 218. Still further, there may also be included a Voice recognition function 320.

According to still another example embodiment, a Generic STB Control Processor 322 is provided. Since there may be many control features that may evolve for the live span of the intended application, there may be employed a scalable application software architecture sometimes referred to as a "plug-in" architecture. A "plug-in" architecture typically implements a generic processing layer, and allows specific control plug-in 324 processes to be implemented and deployed as needed or over time. Additionally, STB Control Plug-ins 324 are provided. These plug-ins 324 implement specific logic for specific STB control features, such as "Turning STB ON/Off", "Parental Control", "DVR control", "Pop-up Blocking", or other logic.

Figure 4:
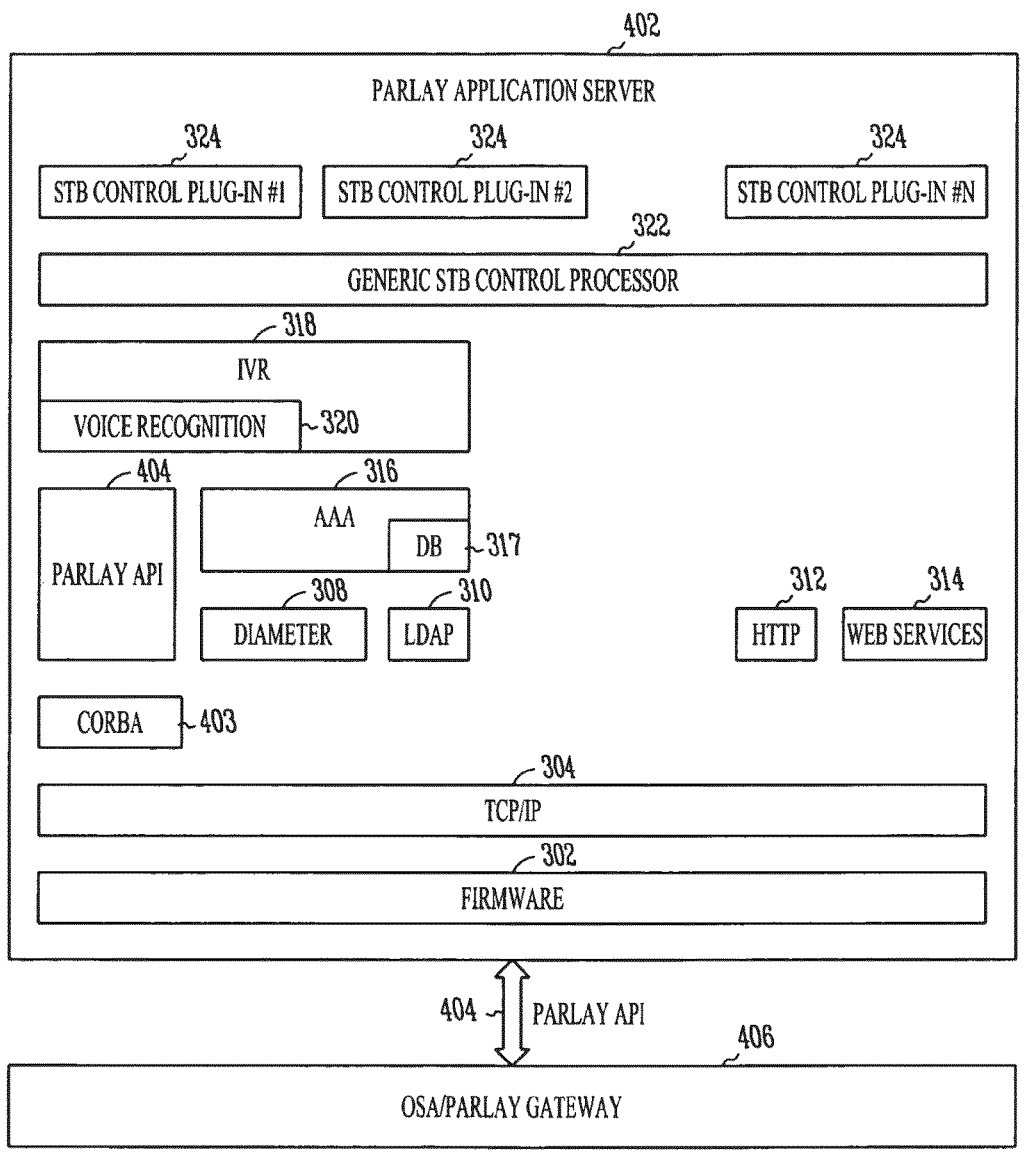

According to another example embodiment 400 illustrated in FIG. 4, a variation of the design of FIG. 3 may include a Parlay application server platform 402 (such as the IBM Corp., WES-T server) that offers Parlay API interface 404. In this situation, a SIP interface 306 is not directly used. Instead, the IMS S-CSCF 244 communicates with an OSA/Parlay gateway (GW) 406 (regarded as another SIP Feature Server 240, such as Lucent's Intelligent Service Gateway (ISG)). The Parlay GW 406, in turn, communicates with the STB Control Server 238 that is now implemented on a Parlay Server Platform by using the Parlay API interface 404. A Common Object Request Broker Architecture (CORBA) interface 403 may be positioned between the TCP/IP layer 304 and the Parlay API 404. Still another possible implementation variation would be to use a stand-alone IVR/Voice Recognition hardware for resource intensive multi-media processing. It may use an application server to implement, API interface with such a hardware for Communication with the SIP UA 306 or Parlay API 404 to retrieve caller's key or voice inputs, or for Communication with the Generic STB Controller Processor 322 and the AAA functional module 316 to convey the caller's command to right handlers.

Figure 5:
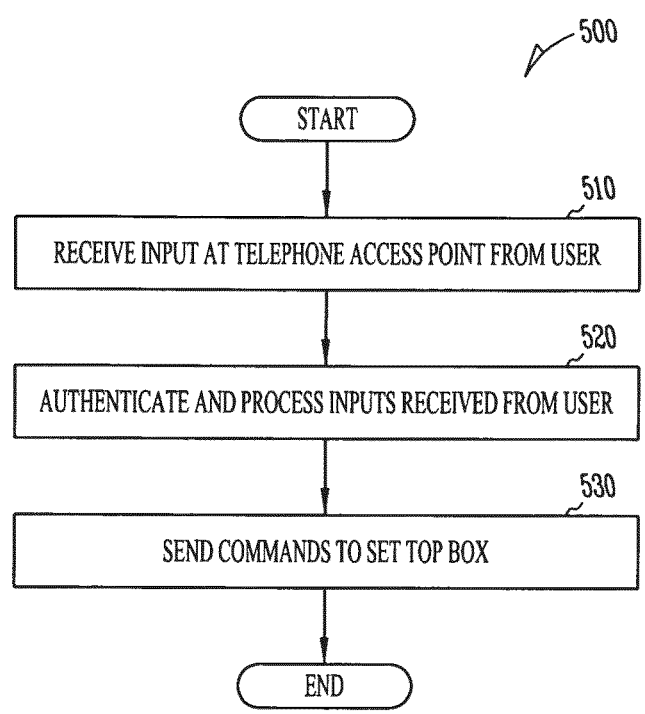
FIG. 5 illustrates one example embodiment of a method for remote control of a set top box according to one example embodiment of the inventive subject matter disclosed herein.

Referring now to FIG. 5, there is described one example embodiment 500 of a method according to the inventive subject matter described herein. The method may call for receiving 510 one or more inputs entered by a user using a telephone access point. The user is authenticated, for example automatically using a caller ID, or manually using a phone number and PIN code entered at the telephone access point, and following successful authentication by whatever means the user input is received and processed 520. Commands are sent 520 to a set top box in response to the one or more inputs. According to one example embodiment, the telephone access point is selected from the group: a telephone connected to a public switched telephone network, a soft phone operable on a personal computer, a mobile telephone connected at least in part to the public switched telephone network, or an Internet Protocol (IP) telephone device connected at least in part to the public switched telephone network through an IP data pathway. According to another example embodiment, the method provides for sending commands to a set top box from a remote location, wherein the commands are determined from one or more inputs obtained from a telephone access point. According to another example embodiment, the input from the telephone access point and the commands to the set top box may be communicated using a packet switched path, a circuit switched path or a dedicated link. According to still another example embodiment, the set top box is controlled so as to perform one or more functions selected from the group: on/off, channel change, volume control, menu activation for STB functions, menu selections and entry, record or play.

In accordance with further example embodiments described hereinbelow, there are provided more detailed processes and call flows. According to one example embodiment, there is provided a special dial code that may be published to eligible customers of the IMS Service and its peering customers. According to another example embodiment, there may be provided a quick dial code in the form of three or four digits (such as *88, etc.) or an 1-8xx-YYY-YYYY number for the service.

According to one example embodiment of provisioning, a dial plan, translation table and routing number all may be provisioned in IMS platform 222 so that the IMS platform 222 may perform digit analysis, recognize the incoming call, and route the incoming call to the STB Control Server 238. The STB Control Server 238 may be assigned by a standard IMS Public Service Identity (PSI) and the translation rules in IMS SIP Feature Server 240 would include a provisioning of mapping of the designated call number (8xx or a 3-digit number) to the IMS PSI identifying the STB Control Server 238. If the service is offered to wireless customers, then the same routing and translation rules may be provisioned in any wireless switching circuits for wireless network 234. If the service is offered to PSTN wireline customers, then the same routing and translation rules may be provisioned in the partnering wireless networks. These procedures may be standard and similar to provisioning other 8xx and three-digit calls.

According to one example embodiment of customer activation provisioning, when a customer is activated with subscription to services, for example IPTV and CVoIP service, the network-based control of STB 218 may be offered as either a free feature, or a valued added service. The customer activation provisioning may involve provisioning of customer data to both IMS platform 222 (in the HSS database 248) and the OSS 202 network database (such as the LDAP and SDP). In the LDAP database, there may be mappings of VoIP service account information to IPTV subscriber account information, which is typically a many-to-many relationship since a subscriber may have multiple telephone numbers and multiple STB/TV services.

Optionally, customer's access authorization is provisioned into at least one of the databases: HSS, LDAP, or the optional local database in the STB Control Server 238. If the information is kept local in the Server 238, then the information between the AAA function and the database is an internal implementation decision. If the information is stored in the HSS database 248 as the application's transparent data, then the Server 238 may use the DIAMETER protocol to communicate with the HSS database 248. If the information is provisioned and stored in the OSS 202 LDAP database, the Server 238 may interface with the LDAP via a standard LDAP API.

According to still another example embodiment of customer self-service provisioning, the existing CVoIP web portal may be enhanced for customer self-service provisioning, for example to enable a customer to log in to the portal to:
1. Change or reset the password; or
2. To enable or disable a particular remote control function that may be accessed from phones. According to one example embodiment, the change of the setups may be propagated through the back office network to the LDAP, HSS database 248, and the local database within the STB Control Server 238

According to another example embodiment the call flow process may proceed as follows:
1. When a customer dials the special access code from a standard IMS user endpoint device, either from the Internet or from home, the IMS platform 222 may receive a SIP INVITE message. The dialed digits may be contained in the "To" header, and in the "Request-URI" (wherein URI means Uniform Resource Identifier) header, either in TEL (telephone) URI or SIP URI format.
   a. If a customer dials from a wireless phone, the routing and translation setups in the wireless network 234 may eventually route the call to the IMS platform 222. It may arrive at S-CSCF 244 as a standard SIP INVITE message. The dialed digits may be contained in the "To" header, and possibly in "Request-URI" header, either in TEL URI or SIP URI format.
   b. If a customer dials from a PSTN phone, the routing and translation set ups in the PSTN 232 may eventually route the call to the IMS platform 222. It may arrive at S-CSCF 244 as a standard SIP INVITE message. The dialed digits may be contained in the "To" header, and possibly in "Request-URI" header, either in TEL URI or SIP URI format.
2. When the S-CSCF 244 receives the SIP INVITE, a pre-provisioned Filter Criteria (iFC) and associated Service Point Trigger (SPT) causes the S-CSCF 244 to forward the SIP INVITE to SIP Feature Server 240.
3. The SIP Feature Server 240 performs the digit analysis, and recognizes that this is a special dialing code. From its translation table, it should find the responsible PSI (Public Service Identifier) of the target STB Control Server 238. The SIP Feature Server 240 may replace the "To" header and the "Request-RUI" with the PSI of the STB Control Server 238. The SIP Server may return the modified SIP INVITE back to S-CSCF 244.
4. After receiving the SIP INVITE from the SIP Feature Server 240, the S-CSCF 244 may obtain the PSI from either the "Request-URI" or the "To" header. It may match another provisioned Filter Criteria and the corresponding Service Point Trigger (SPT) may cause the call process to be advanced to the STB Control Server 238. The S-CSCF 244 thus forwards the SIP INVITE to the STB Control Server 238.

5. The terminating SIP user agent 315 receives the SIP INVITE, handle the session logic, and responses with a SIP "200 OK" back to S-CSCF 244.
6. The S-CSCF 244 may return the S-CSCF 244 back to the caller. If the caller is dialing from wireless network or 234 or from a PSTN 232, the IMS Media Gateway 241 may terminate the SIP message "200 OK" and generate ringback tone instead.
7. The caller IMS device may respond with SIP "200 OK", which reaches the STB Control Server 238 and complete a call session setup. If the caller is dialing from wireless network 234 or from a PSTN 232, the IMS Media Gateway 241 may receive telephony signals to indicate the media path setup. MG may then generate a SIP "200 OK" back to the STB Control Server 238.
8. After the call session is set up, the call enters the interactive mode between the caller and the STB Control Server 238, for example as described below.
9. The STB Control Server 328 first challenge the caller to verify the access password. The AAA functional module is responsible to perform authentication and authorization. It typically uses the IVR functional module 318 to handle user interaction and digit collection. An IVR functional module may be, in one example embodiment, be implemented as a computer program operating on a computing device or system, or may be implemented with any combination of dedicated hardware and software components. An IVR functional module may sometimes be referred to herein as a interactive voice response unit, and such a unit may be formed with software components operative on a general or special purpose computing device, or may be formed of dedicated hardware, or both. With voice recognition, it may use voice mode interaction to collect ID and password. The system may even use voice recognition for voice based authentication.
10. If the caller is permitted for access, then the IVR functional module 318 may advance to present the caller with a command menu. The command menu may be structured based on human factor considerations and usually need to balance the hierarchical structure of the commands and the easy-to-use. According to one example embodiment, several of the most frequently used commands may be placed in a short cut menu to allow one button access, and then organize the complete command sets and option choices into a hierarchical fashion. The IVR functional module 318 may be assisted by voice recognition unit so that caller don't have to push button and rather, just speak the choice of command and options.
11. When the IVR functional module 318 has determined what control action the caller desires, the IVR functional module 318 may forward the command information to the Generic STB Control Processor 322. As described above with respect to FIGS. 3 and 4, the Generic STB Control Processor 322 provides a common layer of application interface to the IVR functional module 318, and a plug-in 324 framework to allow dynamic additions of various feature plug-ins 324. The processor 322 is also responsible for the command process management, task scheduling, and QoS based queuing policy. The generic processor 322 may route each command to appropriate control processing plug-in(s). According to one example embodiment, there may be implemented simpler STB control functions. According to another example embodiment, a caller may request multiple STB control actions in one call, and more complex logics in the generic control processor may be used to provide a suitable level of semantic understanding of a control task being executed, for example with the coordination of multiple plug-ins 324.
12. Finally, a STB Control Plug-in 324 gets the command. It may process the command, construct an appropriate API call, and send it to IPTV service system in the IPTV hub office 210.

Figure 6:
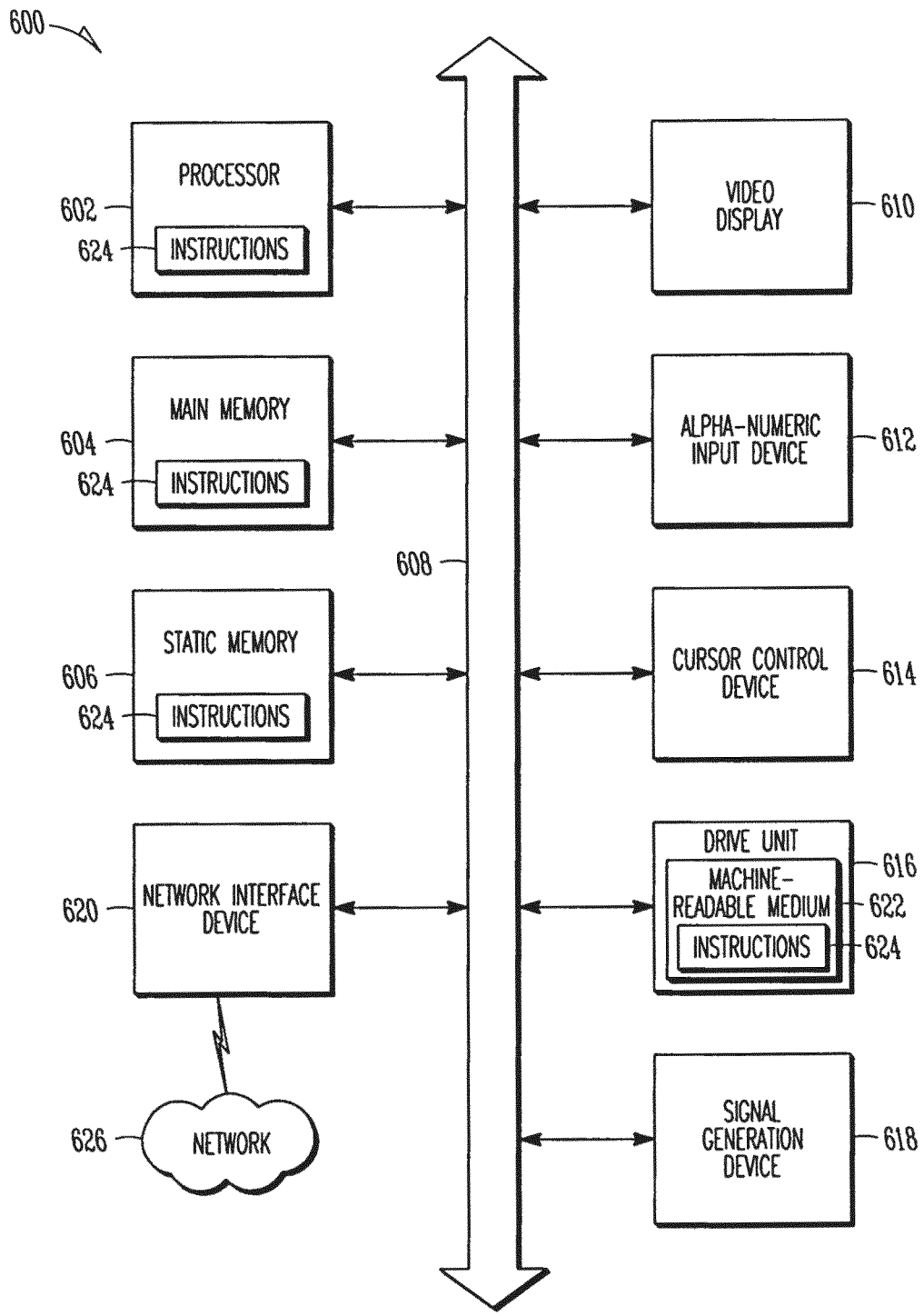
FIG. 6 illustrates an example embodiment of a computer system and software according to one example embodiment of the inventive subject matter disclosed here.

According to another example embodiment, STB Control Plug-ins 324 may be provided. Example embodiments of STB Control Plug-ins 324 are described below. The following list is not exhaustive, however, since the inventive subject matter is highly scalable for any STB control functions that may be supported by, for example, TV2 clients. Marketing and human factor studies may be used to determine which STB control functions should be supported. The following example plug-ins 324 may be provided:

Turn on a STB;
Turn off a STB;
Start a DVR recording;
Stop a DVR recording;
Select and start a VOD;
Select a channel;
Block a channel;

FIG. 6 shows a diagrammatic representation of a machine in the example form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" may also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 650 (e.g., a keyboard), a cursor control device 652 (e.g., a mouse), a disk drive unit 654, a signal generation device 656 (e.g., a speaker) and a network interface device 620. The disk drive unit 654 includes a machine-readable medium 656 on which is stored one or more sets of instructions and data structures (e.g., software) 658 embodying or utilized by any one or more of the methodologies or functions described herein. The instructions 658 may also reside, completely or at least partially, within the main memory 604 and/or within the processor 602 during execution thereof by the computer system 600, the main memory 604 and the processor 602 also constituting machine-readable media. The instructions 658 may further be transmitted or received over a network 660 via the network interface device 662 utilizing any one of a number of well-known transfer protocols, for example the hyper text transfer protocol (HTTP).

While the machine-readable medium 656 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" may also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" may accordingly be taken to include, but not be limited to, solid-state memories, optical and magnetic media, and carrier wave signals.

In this description, numerous specific details are set forth. However, it is understood that embodiments of the invention may be practiced without these specific details. In other instances, well-known circuits, software, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as may be readily apparent to those of ordinary skill in the art. Thus, the inventive subject matter may include any variety of combinations and/or integrations of the embodiments described herein. Each claim, as may be amended, constitutes an embodiment of the inventive subject matter, incorporated by reference into the detailed description. Moreover, in this description, the phrase "exemplary embodiment" means that the embodiment being referred to serves as an example or illustration. Further, block diagrams illustrate exemplary embodiments of the invention. Also herein, flow diagrams illustrate operations of the exemplary embodiments of the invention. The operations of the flow diagrams are described with reference to the exemplary embodiments shown in the block diagrams. However, it should be understood that the operations of the flow diagrams could be performed by embodiments of the invention other than those discussed with reference to the block diagrams, and embodiments discussed with reference to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel.

What is claimed is:

1. A system comprising:
    a set top box control processor, comprising:
        a common-layer application interface;
        a control plug-in framework comprising a plurality of control plug-in processes in communication between the common-layer application interface and a set top box in communication with the set top box control processor, wherein the plurality of control plug-in processes allow for control of control features of the set top box by way of the common-layer application interface;
    a memory to store executable instructions; and
    a processor in communication with the memory, wherein the processor, responsive to executing the instructions, facilitates performance of operations comprising performing a command process management; and
    an interactive voice response unit in communication with the common-layer application interface of the set top box control processor to obtain voice inputs from a voice call sent from a location remote from the set top box over a communication network using a telephone access point, and to associate the voice inputs with a plurality of set top box commands that when presented to the common-layer application interface, are usable to remotely access a plurality of control features of the set top box by way of the plurality of control plug-in processes,
    wherein performing of the command process management comprises managing a command of the plurality of set top box commands,
    wherein the plurality of set top box commands comprise a power-on command from a powered off state and one of a record function, a play function or a combination thereof,
    wherein the set top box control processor is operative to route a set top box command of the plurality of set top box commands to a control plug-in process of the plurality of control plug-in processes of the control plug-in framework by way of the common-layer application interface to control remotely a control feature of the plurality of control features of the set top box comprising changing channels and controlling volume without user intervention and without user presence at the set top box, and
    wherein the interactive voice response unit interactively transmits voice prompts and generates the set top box command of the plurality of set top box commands based on a voice input received without interaction with the set top box.

2. A system according to claim 1, wherein the operations further comprise task scheduling.

3. A system according to claim 1, wherein the operations further comprise a quality of service based on queuing policy.

4. A system according to claim 1, wherein the interactive voice response unit operates in the communication network that supports one of circuit-switched communications, packet-switched voice communications or both.

5. A system according to claim 1, wherein the set top box commands comprise a set top box menu activation command for set top box functions.

6. A system according to claim 1, wherein the set top box commands comprise a menu selection command and a menu selection entry command.

7. A system according to claim 1, wherein the set top box command of the plurality of set top box commands routed by the set top box control processor are processed at the set top box without user interaction with the set top box.

8. A system comprising:
    a memory to store executable instructions; and
    a processor in communication with the memory, wherein the processor, responsive to executing the instructions, performs operations comprising controlling remotely a plurality of set top box features without user intervention and without user presence at the set top box, wherein the plurality of set top box features comprises a power on from a powered off state, a channel change and a volume control at the set top box based on a plurality of set top box inputs received from an interactive voice response unit at a common-layer application interface of a controller of the set top box that obtains voice inputs from a voice call from a telephone at a location remote from the set top box during a voice communication exchange and associates the voice inputs with a plurality of set top box commands that when presented to the common-layer application interface, are usable to remotely access the plurality of set top box features by way of a plurality of plug-in modules, wherein the plurality of set top box inputs are routable by the controller of the set top box to appropriate plug-in modules of the plurality of plug-in modules of a control plug-in framework by way of the common-layer application interface to control remotely the plurality of set top box features without user intervention and without user presence at the set top box, wherein the interactive voice response unit interactively transmits voice prompts and generates the set top box command of the plurality of set top box commands based on a voice input received without interaction with the set top box, wherein the plurality of plug-in modules are in communication between the common-layer application interface and the set top box, and wherein the plug-in modules of the plurality of plug-in modules implement specific logic associated with the channel change and volume control features of the set top box, wherein the control plug-in framework provides command process management to manage the plurality of set top box commands, and wherein the plurality of set top box inputs received at the set top box from the interactive response unit are processed at the set top box without user interaction with the set top box.

9. A system according to claim 8, wherein the processor is external to the set top box.

10. A system according to claim 8, wherein the control plug-in framework provides task scheduling.

11. A system according to claim 8, wherein the control plug-in framework provides quality of service based on queuing policy.

12. A system according to claim 8, wherein the telephone is connected with a network that supports one of circuit-switched communications, packet-switched voice communications, or both.

13. A system according to claim 8, wherein the set top box is controlled so as to perform one of a power on function, a power off function, a menu selection function, a menu entry function or combinations thereof.

14. A system according to claim 8, wherein the set top box is controlled so as to perform one of a record function, a play function or a combination thereof.

15. A system according to claim 8, wherein a communication path between the set top box and a computing system comprising the processor comprises one of a packet switched path, a circuit switched path, a dedicated link or a combination thereof.

16. An article of manufacture comprising instructions stored on a non-transitory machine readable medium, wherein the instructions responsive to being executed by a processor, cause the processor to perform operations comprising:

receiving, from an interactive voice response unit, a set top box command of a plurality of set top box commands to remotely control the operation of a set top box; and forwarding, to the set top box, the set top box command by way of a common-layer application interface of a set top box control server, the set top box control server also having a control plug-in framework comprising a plurality of plug-in modules in communication between the common-layer application interface and the set top box, wherein the control plug-in framework provides command process management to manage the plurality of set top box commands, wherein the set top box commands are routable by the set top box control server to plug-in modules of the plurality of plug-in modules by way of the common-layer application interface to implement specific logic associated with specific set top box control features comprising channel changing and volume controlling without user presence at the set top box, wherein the set top box commands are based on input obtained from a voice call sent from a location remote from the set top box using a telephone access point, wherein the input is received at the interactive voice response unit without set top box interaction, wherein the set top box commands comprise a power-on command from a powered off state, and wherein the set top box is controlled so as to perform one of a record function, a play function or a combination thereof.

17. An article of manufacture according to claim 16 wherein the telephone access point comprises one of a telephone connected to a public switched telephone network, a soft phone operable on a personal computer, a mobile telephone connected at least in part to the public switched telephone network, or an internet protocol telephone device connected to the public switched telephone network through an internet protocol data pathway.

18. An article of manufacture according to claim 16, wherein the plug-in framework provides one of task scheduling, determining a quality of service based on queuing policy, or a combination thereof.

19. An article of manufacture according to claim 16, wherein the set top box is controlled so as to perform one of an on/off function or a menu activation function to access set top box functions.

20. An article of manufacture according to claim 16, wherein the set top box is controlled so as to perform menu selection and entry functions.

* * * * *